United States Patent
Baba (10) Patent No.: US 10,498,710 B2
(45) Date of Patent: Dec. 3, 2019

(54) SYSTEM, RELAY CLIENT, CONTROL METHOD, AND STORAGE MEDIUM HAVING PASSWORD RESET FOR AUTHENTICATION

(71) Applicant: CANON KABUSHIKI KAISHA, Tokyo (JP)

(72) Inventor: Shohei Baba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 15/481,132

(22) Filed: Apr. 6, 2017

(65) Prior Publication Data
US 2017/0302637 A1 Oct. 19, 2017

(30) Foreign Application Priority Data
Apr. 13, 2016 (JP) .................................. 2016-080647

(51) Int. Cl.
*H04L 29/06* (2006.01)
*H04L 29/08* (2006.01)

(52) U.S. Cl.
CPC .......... *H04L 63/06* (2013.01); *H04L 63/0428* (2013.01); *H04L 63/083* (2013.01); *H04L 67/1097* (2013.01); *H04L 67/28* (2013.01)

(58) Field of Classification Search
CPC ... H04L 63/06; H04L 63/0428; H04L 63/083; H04L 63/08; H04L 63/0853; H04L 67/1097; H04L 67/28; H04L 9/06; H04L 9/0863; H04L 9/0866; H04L 9/0877;
(Continued)

(56) References Cited

U.S. PATENT DOCUMENTS

| | | | |
|---|---|---|---|
| 7,353,536 B1 * | 4/2008 | Morris .................... | G06F 21/31 709/203 |
| 9,288,202 B1 * | 3/2016 | Felton .................... | H04L 63/083 |
| 9,313,193 B1 * | 4/2016 | Mehta .................... | H04L 63/08 |

(Continued)

FOREIGN PATENT DOCUMENTS

| WO | 10/050192 A1 | 5/2010 | |
|---|---|---|---|
| WO | WO-2010050192 A1 * | 5/2010 | ........... H04L 63/083 |

OTHER PUBLICATIONS

Kido Keisuke, Password Reissuing Method, May 2010, PCT, WO-2010050192-A1, English Human Translation (Year: 2018).*

(Continued)

*Primary Examiner* — Carl G Colin
*Assistant Examiner* — Tarek Elarabi
(74) *Attorney, Agent, or Firm* — Canon U.S.A., Inc. IP Division (57) ABSTRACT

A server stores first verification information corresponding to a relay client, and transmits information for displaying a resetting screen of a password to be used for second authentication for using a second management screen provided by the relay client when authentication for using a first management screen provided by the server has succeeded. The relay client verifies validity of the first verification information included in information included in a request accepted from the information processing apparatus, and provides the resetting screen for changing the password to the information processing apparatus when the validity of the first verification information is verified.

7 Claims, 9 Drawing Sheets

(58) Field of Classification Search
CPC ... H04L 63/062; H04L 63/0281; G06F 21/31; G06F 21/44; H04W 12/06
See application file for complete search history.

(56) References Cited

U.S. PATENT DOCUMENTS

2006/0168580 A1\* 7/2006 Harada ............... G06F 21/10
                                                717/174
2015/0248553 A1\* 9/2015 Strand ............. H04L 63/0815
                                                726/6

OTHER PUBLICATIONS

Kido Keisuke, Password Reissuing Method, May 2010, PCT, WO-2010050192-A1, English Machine Translation (Year: 2018).\*

\* cited by examiner

USER ID [          ]

PASSWORD [          ]

[ LOG IN ]

602

WELCOME! XXX!

[ TO DEVICE MANAGEMENT SCREEN ]

[ TO RELAY CLIENT MANAGEMENT SCREEN ]

603

RELAY CLIENT DETAIL INFORMATION

CLIENT ID [asdl8hv984h9a8uv9]

CLIENT NAME [Client AAA]

PASSWORD RESETTING URL [http://xxxxxxxxxxxxxxxxx]

*FIG. 7*

701 https://<IP ADDRESS>:<PORT NUMBER>/ResetPassword.aspx?<VERIFICATION CHARACTER STRING>

SYSTEM, RELAY CLIENT, CONTROL METHOD, AND STORAGE MEDIUM HAVING PASSWORD RESET FOR AUTHENTICATION

BACKGROUND OF THE INVENTION

Field of the Invention

The present disclosure relates to a system, a relay client, a control method, and a storage medium for resetting a password to be used for authentication.

Description of the Related Art

Conventionally, there are systems including a relay client that collects data of a network device, and a server that manages the data of the network device transmitted from the relay client. An example of the systems includes a device management system. In the device management system, the relay client monitors an operation state of the network device, and the server outputs a report of actual performance of use of the network device, and the like. Such a relay client and a server can provide a management screen to an information processing apparatus including a web browser. Here, the management screen is a screen provided to an authenticated user by inputs of a login name and a password, and can display data collected from the network device, and the like. On the management screen of the relay client, setting in collecting the data from the network device and network settings of an installation environment of the relay client, which is essential for communication with the server, can be performed.

Further, conventionally, as a method for resetting a password in a case where a user forgets the password to be used for authentication such as login, many methods using an electronic mail have been proposed. International Publication No. 10/050192 describes that an authentication server transmits an electronic mail including a URL for accessing a setting screen of a password to a user when receiving a password reissuance request from the user.

In the above-described system, in a case where the user who intends to use the management screen of the relay client forgets the password for login, the password needs to be reset. If the user cannot perform login for using the management screen of the relay client, the user cannot change the network settings necessary for communication with the server.

In this prior art system, only a user managed (registered) in a server as a user of a relay client can reset a password that is managed in the relay client for login to a management screen of the relay client.

To apply the above-described method of International Publication No. 10/050192 to reset the password, use of a mail function of the relay client is necessary. However, when the mail function of the relay client cannot be used, or when the relay client does not have the mail function, the above-described method of International Publication No. 10/050192 cannot be applied.

SUMMARY OF THE INVENTION

To solve the above-described problem, the present disclosure is a system including a relay client configured to collect data, a server configured to manage the data transmitted from the relay client, and an information processing apparatus capable of displaying a second management screen provided by the relay client. The server includes a memory storing first instructions and a processor which is capable of executing the first instructions. The first instructions cause the server to store first verification information corresponding to the relay client and perform first authentication for using a first management screen provided by the server. The first instructions cause the server to transmit information for displaying the resetting screen, including the first verification information corresponding to the relay client, in response to a request regarding a resetting screen of a password to be used for second authentication for using the second management screen. The request has been performed through the first management screen when the first authentication has succeeded. The relay client includes a memory storing second instructions and a processor which is capable of executing the second instructions. The second instructions cause the relay client to store second verification information corresponding to the relay client, manage the password to be used for the second authentication for using the second management screen, and accept a request including the transmitted information, from the information processing apparatus. The second instructions cause the relay client to verify validity of the first verification information included in the information included in the accepted request, using the stored second verification information and provide the resetting screen for changing the managed password, to the information processing apparatus, when the validity of the first verification information is verified.

Further features of the disclosure will become apparent from the following description of exemplary embodiments (with reference to the attached drawings).

DESCRIPTION OF THE EMBODIMENTS

Next, embodiments for implementing the present disclosure will be described with reference to the drawings.

First Exemplary Embodiment

Hereinafter, an exemplary embodiment of the present disclosure will be described with reference to the drawings.

The present exemplary embodiment will be described using a device management system as an example of a system. The device management system provides various device management services by collecting device information from a network device existing in a customer network environment of each customer, and operation information such as log information and failure information, and analyzing the collected information.

In the device management system, each of a plurality of relay clients monitors an operation state of one or more network devices, and the like. Then, a server manages data of the network devices that are transmitted from the plurality of relay clients for outputting a report of actual performance of use of the network devices. While the network devices include image processing apparatuses such as a printer and a network camera, the present exemplary embodiment will be described using an image forming apparatus as an example of the network device.

<System Configuration>

Figure 1:
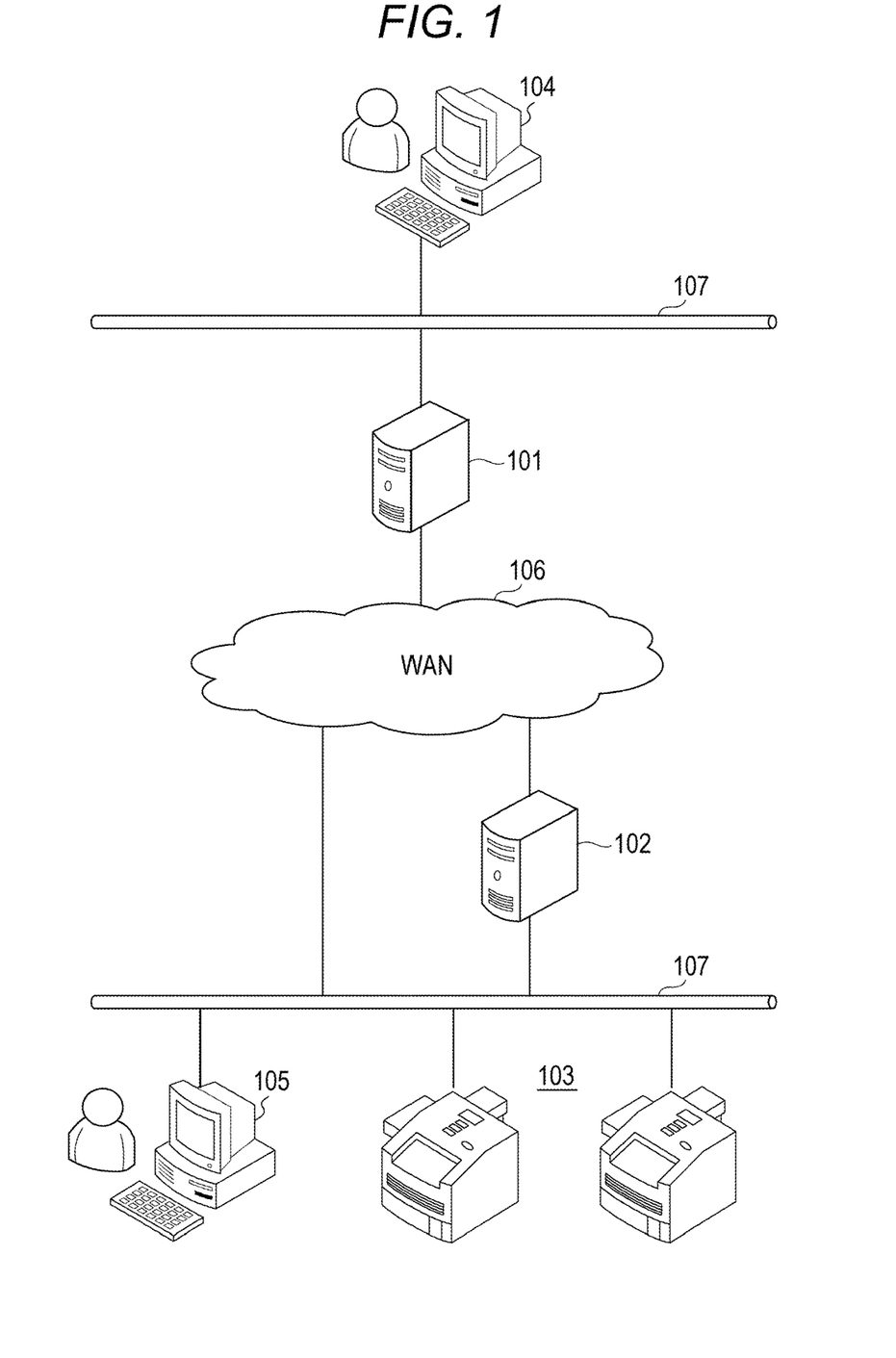
FIG. 1 is a general view of a system illustrating an exemplary embodiment.

FIG. 1 is a general view of a system illustrating an exemplary embodiment of the present disclosure. The system of the present exemplary embodiment includes a relay client that collects data from an image forming apparatus, and a server that manages data collected by the relay client.

In FIG. 1, a server 101 is connected with a relay client 102 through a wide area network (WAN) 106, and manages data of the relay client 102 and an image forming apparatus 103 in a unified manner. Further, the server 101 holds a management screen (not illustrated) for displaying data.

The relay client 102 has a function as a monitoring apparatus that monitors the image forming apparatus 103 through a local area network (LAN) 107, and acquires various data from the image forming apparatus 103. Similarly to the server 101, the relay client 102 holds a management screen. The image forming apparatus 103 is a multi-function device such as a laser beam printer (LBP) or a multi-function peripheral (MFP), and is monitored by the relay client 102. In the present system, a plurality of the relay clients 102 may exist. Further, the relay client does not have a mail function.

A sales company's person in charge personal computer (PC) 104 is a computer operated by a person in charge of a sales company that provides a device management service (the person is referred to as sales company's person in charge). When the sales company's person in charge logs in to the management screen of the server 101, the management screen of the server 101 becomes displayable in the sales company's person in charge PC 104.

A customer manager PC 105 is a computer operated by a customer manager who is a person in charge on a customer side that uses the device management service. When the customer manager logs in to the management screen of the relay client 102, the management screen of the relay client 102 becomes displayable in the customer manager PC 105. The customer manager manages the image forming apparatus 103, and may perform installation and various types of setting of the relay client 102.

Note that the server 101 is connected with the relay client 102 through the WAN 106 in FIG. 1. However, the server 101 may be connected with a LAN 107. Further, the image forming apparatus 103 is connected with the relay client 102 through the LAN 107 in FIG. 1. However, the image forming apparatus 103 may be directly connected with the server 101 through the LAN 107 and the WAN 106.

Although not illustrated, a plurality of environments exists in the system of the present exemplary embodiment. Each of the environments is constructed by the LAN and the like, and includes the relay client, the image forming apparatus, and the customer manager PC. The server 101 manages information of the plurality of relay clients and information of the image forming apparatuses as monitoring targets of the clients, using respective pieces of identification information.

<Inner Configurations of Server, Relay Client, and PC>

Figure 2A:
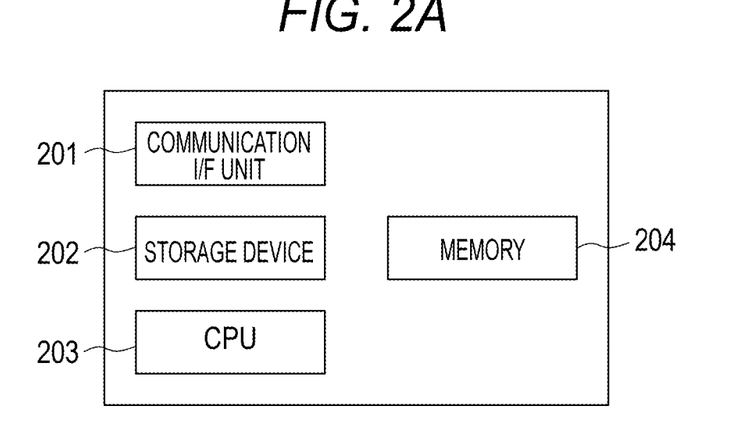
FIGS. 2A and 2B are diagrams illustrating an example of inner configurations of a server, a relay client, and a PC.

FIG. 2A is a diagram illustrating an example of an inner configuration of the server 101 and the relay client 102. The server 101 and the relay client 102 are made of a communication I/F unit 201, a storage device 202, a CPU 203, and a memory 204.

The communication I/F unit 201 is a network interface for performing communication with an external system or device. The storage device 202 stores an operating system (OS), a program, management data, data collected from the external system or device, and the like. The CPU 203 loads the program from the storage device 202 onto the memory 204, and executes the program.

The CPU 203 develops the program for realizing processing (for example, FIGS. 5 and 9) according to the present disclosure, which is stored in the storage device 202, onto the memory 204, and executes the program.

Figure 2B:
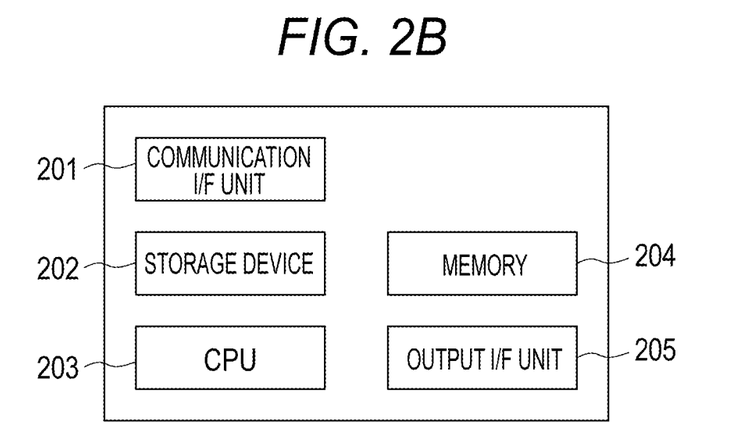

FIG. 2B is a diagram illustrating an example of an inner configuration of a PC that functions as the information processing apparatus such as the sales company's person in charge PC 104 or the customer manager PC 105. The information processing apparatus such as the sales company's person in charge PC 104 or the customer manager PC 105 is made of the communication I/F unit 201, the storage device 202, the CPU 203, the memory 204, and an output I/F unit 205. The output I/F unit 205 connects the PC with an output device such as a display, and outputs an execution result of the program to the output device.

The above-described configurations are controlled in an integrated manner through an internal bus (not illustrated).

<Functional Configuration of Server>

Figure 3:
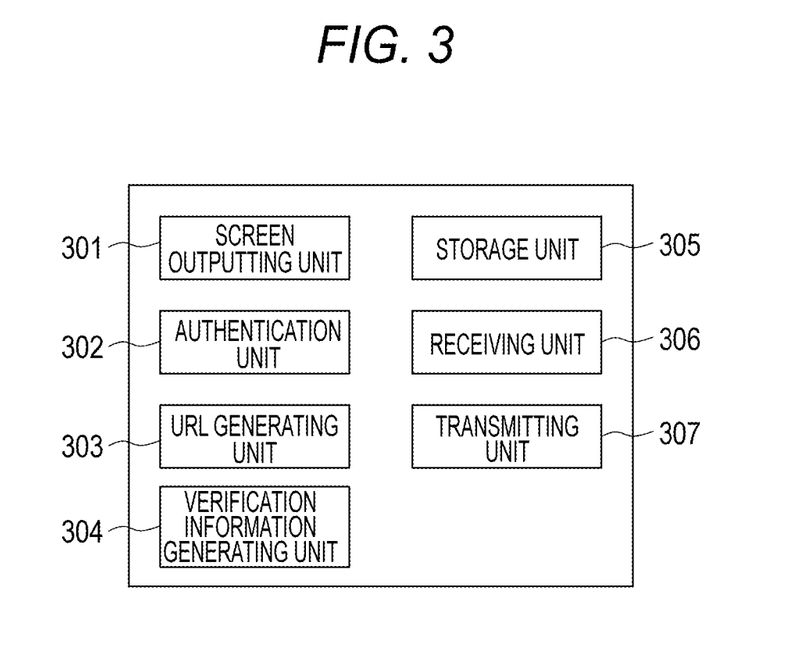
FIG. 3 is a diagram illustrating an example of a functional configuration of the server.

FIG. 3 is a diagram illustrating an example of a functional configuration of the server 101. Functions illustrated in FIG. 3 are realized by reading and executing the program stored in the storage device 202 or the memory 204 by the CPU 203 in the server 101.

A screen outputting unit 301 outputs an appropriate screen according to a request when a held web site is accessed by an external PC using a web browser. That is, the screen outputting unit 301 is a module that realizes a web service server function.

An authentication unit 302 performs authentication of a user who intends to log in to the web site (first management screen) provided by the server 101. Authentication information used for this login is information managed by the server 101, which is different from authentication information for logging in to services provided by the relay client 102, which is described below.

A URL generating unit 303 adds a character string that is encrypted verification information held by the server 101 and by the relay client 102 to a predetermined URL to generate a URL for displaying a password resetting screen of each relay client. The password resetting screen is a screen for changing a password managed by the relay client. When identical verification information held by the server 101 and held by the relay client 102 is used in the description below, the identical verification information is called common verification information.

A verification information generating unit 304 generates verification information to be used for generating the display URL of the password resetting screen of each relay client. Details of the common verification information will be described below using FIG. 5.

A storage unit 305 stores various data in the storage device 202. For example, the storage unit 305 stores identification information of the relay client and the verification information for the relay client in association with each other. Here, the identification information of the relay client is an identifier allocated to a software program for causing a personal computer to function as the relay client, or the like. Further, the above-described authentication information for logging in to the web site provided by the server 101 is also stored in the storage device 202 of the server 101 and managed by the server 101.

A receiving unit 306 receives various requests from the relay client 102. A transmitting unit 307 transmits various requests to the relay client 102.

<Functional Configuration of Relay Client>

Figure 4:
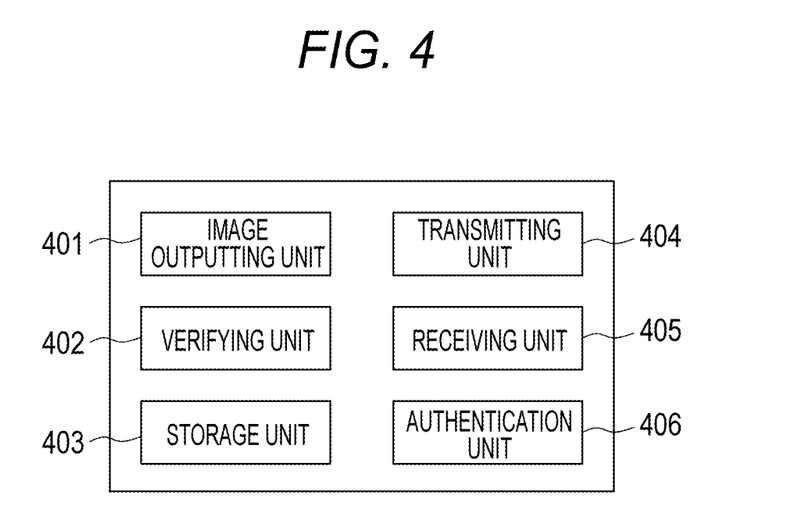
FIG. 4 is a diagram illustrating an example of a functional configuration of the relay client.

FIG. 4 is a diagram illustrating an example of a functional configuration of the relay client 102. FIG. 4 is an example of a function module operated by execution of the software program for causing a personal computer to function as the relay client.

A screen outputting unit 401 outputs an appropriate screen according to a request when a held web site is accessed by an external PC using a web browser. That is, the screen outputting unit 401 is a module that realizes a web service server function.

A verifying unit 402 decrypts the verification character string added to the URL of the password resetting screen when the web site is accessed with the URL, and verifies whether the URL is a valid URL of the password resetting screen.

A storage unit 403 stores various data and a password in the storage device 202. As described above, the authentication information such as a login name and a password for using the services (various web sites) provided by the relay client 102 is stored in the storage device 202 of the relay client 102 itself and managed by the relay client 102.

A transmitting unit 404 transmits various requests to the server 101. A receiving unit 405 receives various requests from the server 101.

An authentication unit 406 performs authentication of a user who intends to log in to the web site (second management screen) provided by the relay client 102.

<Processing for Resetting Password in Present Exemplary Embodiment>

Figure 5:
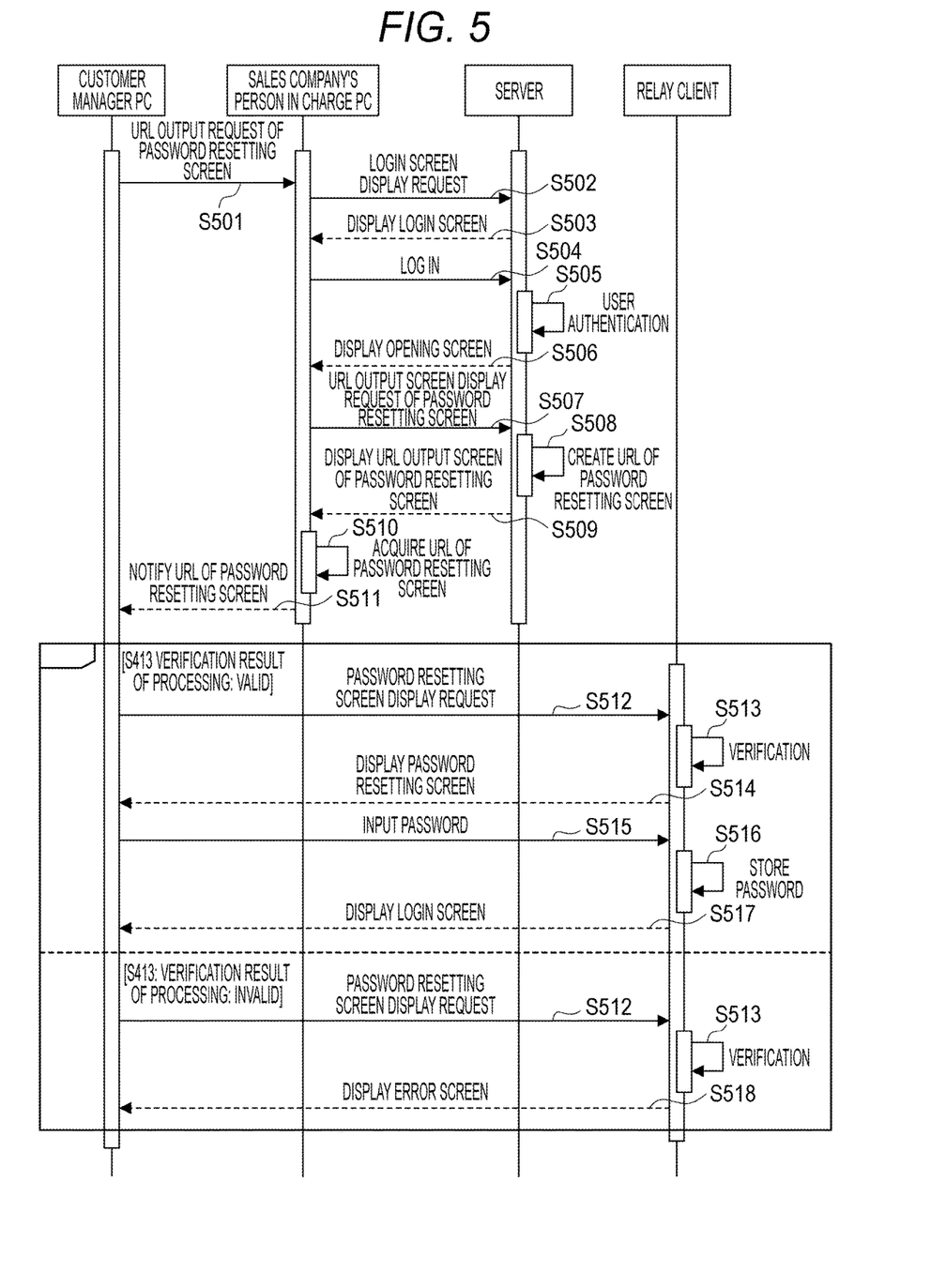
FIG. 5 is a sequence diagram illustrating an example of processing for resetting a password in a first exemplary embodiment.

FIG. 5 is a sequence diagram illustrating an example of processing for resetting a password in the present exemplary embodiment.

In step S501, when the customer manager who forgets the password for logging in to the relay client 102 transmits a mail, using the customer manager PC 105, the customer manager PC 105 performs a URL output request of the password resetting screen to the sales company's person in charge PC 104. When the customer manager PC 105 performs a URL acquisition request of the password resetting screen, the customer manager PC 105 notifies the information (the relay client identifier, a relay client name, and the like) for identifying the relay client together with the request. Further, the information for identifying the relay client may be output on a login screen of the relay client, assuming that the customer manager forgets the information for identifying the relay client as well. The sales company's person in charge PC 104 receives the electronic mail, and accepts the request from the customer manager PC 105. As another requesting method, the persons in charge may be directly in contact with each other by a telephone or the like. The exchange of the electronic mail may not be performed by computers.

In step S502, the sales company's person in charge PC 104 opens a URL of a login screen of the server, and performs a display request of the login screen to the server 101. In step S503, the screen outputting unit 301 of the server 101 outputs the login screen.

In step S504, the sales company's person in charge PC 104 performs login, using a login account of the sales company's person in charge. In step S505, the authentication unit 302 of the server 101 performs user authentication, using account information input by the sales company's person in charge.

In step S506, the server 101 outputs an opening screen after login when the user authentication has succeeded. Although not illustrated in the present sequence diagram, the server 101 outputs an error screen when the user authentication has failed.

In step S507, the sales company's person in charge PC 104 accesses a screen on which the URL of the password resetting screen has been output. Since the URL of the password resetting screen is a URL for each relay client, it is assumed that, normally, the URL of the password resetting screen is output on a screen on which detailed information of the relay client has been output. Therefore, in the present exemplary embodiment, the sales company's person in charge PC 104 accesses the screen on which the detailed information of the relay client has been output on the basis of the relay client identification information notified from the customer manager.

In step S508, the URL generating unit 303 of the server 101 adds the character string that is converted common verification information such as encrypted common verification information to a predetermined URL to generate the URL of the password resetting screen of each relay client.

The common verification information may be a unique authentication key used when the relay client and the server perform communication, or may be temporary information managed for URL generation. Further, in the present exemplary embodiment, the common verification information has already been shared between the server 101 and the relay client 102. For example, the common verification information is exchanged between the server 101 and the relay client 102 at the time of initial communication.

Note that, in the present exemplary embodiment, the server 101 and the relay client 102 hold a common key and the like as the same verification information. Further, as the verification information, an identifier for identifying software operated on the relay client 102 may be further used, in addition to the above-described authentication key. Accordingly, improvement of security regarding the verification information can be expected. Further, as the verification information, the server 101 and the relay client 102 may hold a pair of different pieces of information, respectively, instead of the same information. Further, the relay client 102 may hold a rule for decryption of the information encrypted by the server 101.

In step S509, the screen outputting unit 301 of the server 101 outputs a screen that outputs the URL of the password resetting screen, and includes the URL created in the processing of step S508 to the screen. The URL of the password resetting screen should be issued only when necessary, for security reasons, and the URL of the password resetting screen is not issued to the relay client 102 in advance.

In step S510, the sales company's person in charge PC 104 acquires the URL of the password resetting screen, and displays the acquired URL.

In step S511, an electronic mail is transmitted from the sales company's person in charge PC 104, and the acquired URL of the password resetting screen is notified to the customer manager PC 105. The customer manager PC 105 receives the electronic mail, and acquires the URL of the password resetting screen. The electronic mail is used as the notification method. However, the persons in charge may be directly in contact with each other by a telephone or the like. The exchange of the electronic mail may not be the performed by computers.

In step S512, the customer manager PC 105 opens the acquired URL of the password resetting screen, and performs an acquisition request of the password resetting screen to the relay client 102.

In step S513, the verifying unit 402 of the relay client 102 decrypts the verification character string added to the URL, and confirms whether a value thereof and the common verification information held in the relay client 102 are matched to verify validity of the verification information. When matched, the verifying unit 402 determines that the URL is a valid URL. When the URL is determined to be the valid URL, the processing proceeds to step S514. Meanwhile, when the URL is determined to be an invalid URL, the processing proceeds to step S518.

In step S514, the screen outputting unit 401 of the relay client 102 responds to the customer manager PC 105 with the password resetting screen.

In step S515, the customer manager sets a new password from the password resetting screen. In step S516, the storage unit 403 of the relay client 102 stores the set new password to the storage device 202 shown in FIGS. 2A and 2B.

In step S517, the screen outputting unit 401 of the relay client 102 redirects the login screen of the relay client 102. Here, the screen outputting unit 401 redirects the login screen of the relay client 102. However, the screen outputting unit 401 may transition to another page, or may not transition to other pages.

In step S518, the screen outputting unit 401 of the relay client 102 outputs an error screen of the relay client 102. Here, the screen outputting unit 401 displays the error screen. However, the screen outputting unit 401 may transition to another page.

Note that, as another method, in step S513, the verifying unit 402 of the relay client 102 performs processing for the common verification information held in the relay client 102, the processing being the same as the conversion processing performed by the server 101 in step S508. In this case, the validity of the verification information is verified by comparison between the character string converted by the verifying unit 402 and the character string added to the URL.

<Various Screens of Server>

Figure 6:
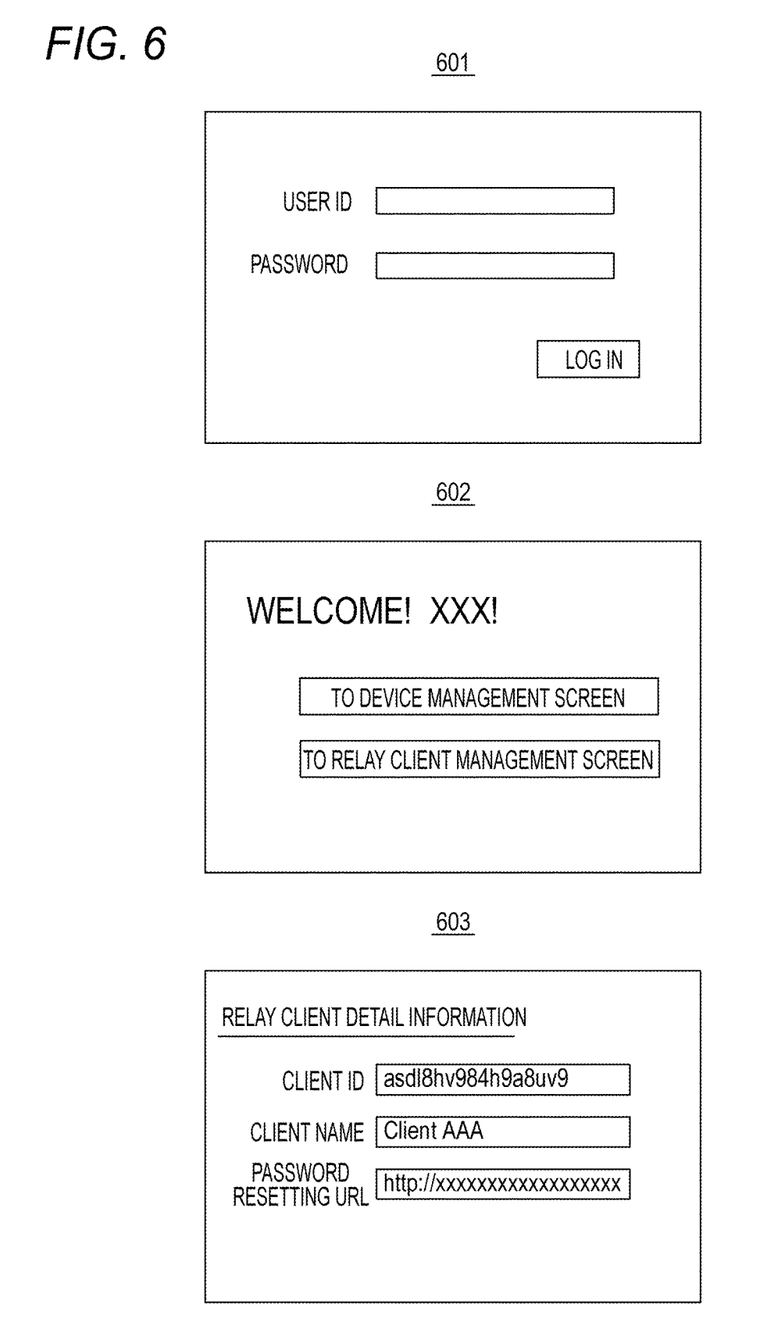
FIG. 6 is diagrams illustrating an example of various screens on the server in the first exemplary embodiment.

FIG. 6 is diagrams illustrating an example of various screens on the server 101.

On a login screen 601, text boxes to which a user ID and a password are input as login information are prepared, and a button for executing login is also prepared.

On an opening screen 602, a message after login and a link button to various management screens are prepared. Here, the link bottoms to a device management screen and to a relay client management screen are prepared. The "device" here refers to the image forming apparatus 103.

Here, the management screen of the relay client is often used to perform login when connection setting with the server is performed, and the number of times of login through the management screen is smaller than that through the device management screen. Therefore, it is assumed that the user is apt to forget the password.

A URL output screen 603 of the password resetting screen is a details screen of the relay client 102 that is selected by the logged-in user, and for which the user wants to reset the password. Here, the URL of the password resetting screen is output together with the client ID and the client name. The "client" referred here is the relay client 102. Obviously, the configuration of the screens is not limited thereto, and may be any configuration. Screens going through when transition is made from the opening screen to the URL output screen of the password resetting screen are omitted here. Any transition is employable.

Further, as the management screen of the server, the server may have a management screen accessed by the customer side, in addition to the management screen accessed by the sales company's person in charge. The URL of the password resetting screen may be output to the management screen accessed by the customer side. In this case, the person in charge (may be the customer manager) of the customer side acquires the URL of the password resetting screen from the management screen of the server, which is accessed by the customer side. Here, use of the management screen accessed by the sales company's person in charge and the management screen accessed by the customer side will be described.

Next, although not illustrated, the management screen accessed by the sales company's person in charge will be described. The present screen is used to perform registration of the relay client and the image forming apparatus, creation of a report using data of the image forming apparatus collected from the relay client, confirmation of an operation state of the image forming apparatus, and the like.

Further, although not illustrated, the management screen accessed by the customer will be described. The present screen is used to perform download of a monitoring module to be installed to the relay client, acquisition of the report, confirmation of the operation state of the image forming apparatus, and the like.

As described above, the management screens of the server 101 are periodically accessed to perform confirmation of the operation state of the image forming apparatus, creation/acquisition of the report, and the like, and it is assumed that the password for logging in to the management screen is not forgettable.

<Example of URL of Password Resetting Screen>

Figure 7:
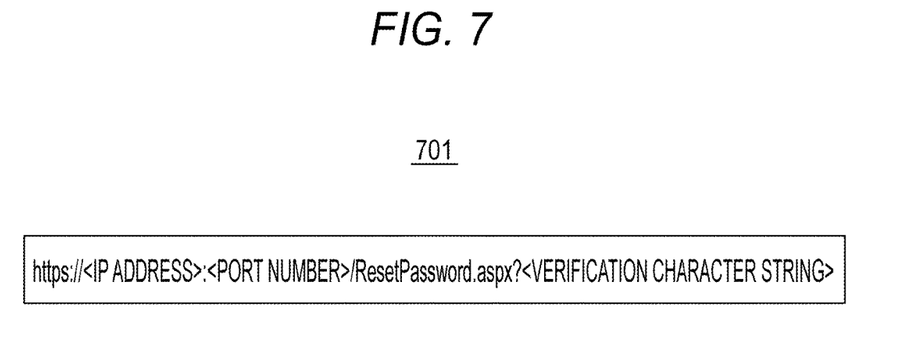
FIG. 7 is a diagram illustrating an example of a URL of a password resetting screen.

FIG. 7 illustrates an example of the URL of the password resetting screen. Here, a configuration of the URL of the password resetting screen will be described using FIG. 7.

The URL 701 of the password resetting screen starts from an IP address and a port number of the relay client 102, followed by a character string of "ResetPassword.aspx", and then by the verification character string. Obviously, the format is not limited thereto, and a URL in any format or of any name may be used.

<Various Screens of Relay Client>

Figure 8:
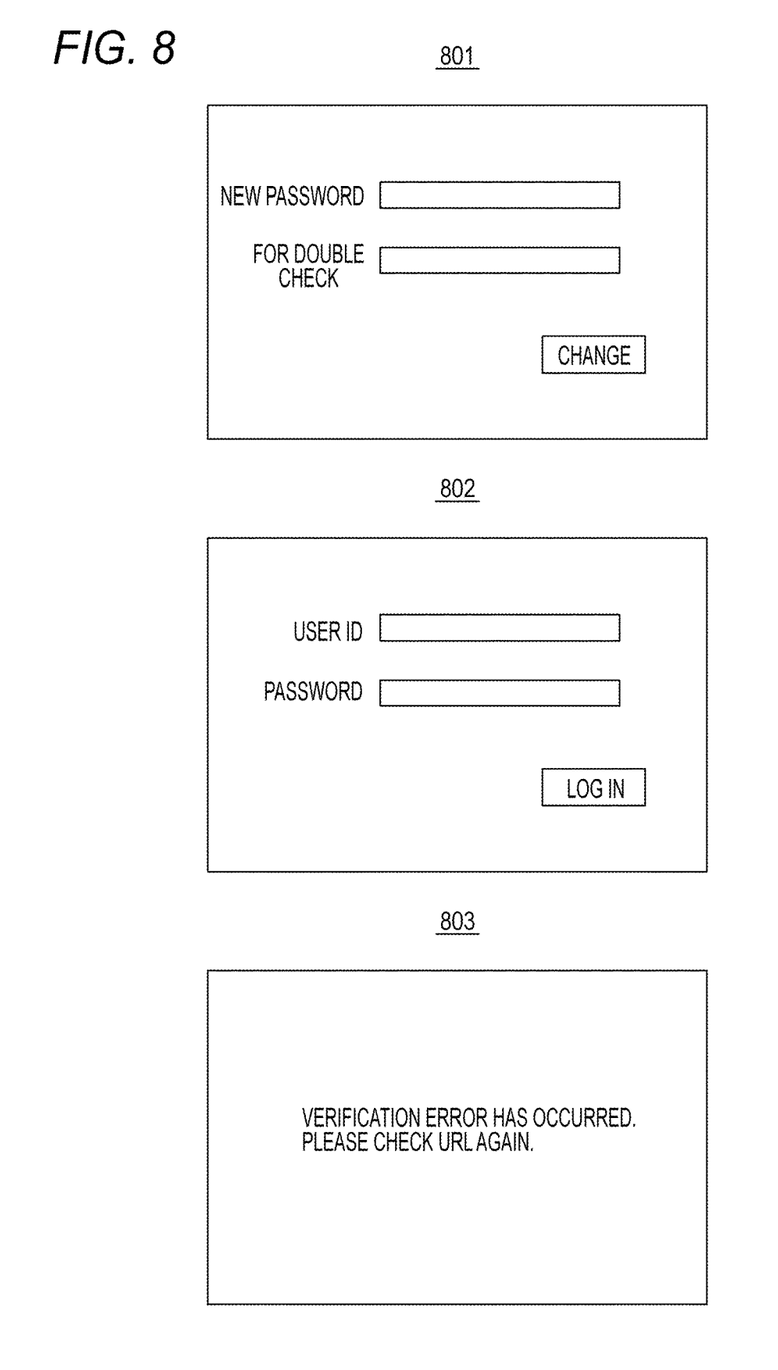
FIG. 8 is diagrams of an example of various screens of the relay client in the first exemplary embodiment.

FIG. 8 is diagrams illustrating an example of various screens of the relay client 102.

On a password resetting screen 801, text boxes in which a new password and a password for double check are input are prepared, and a button for executing password resetting is also prepared.

On a login screen 802, text boxes in which a user ID and a password are input as the login information are prepared, and a button for executing login is also prepared.

An error screen 803 is a screen that output words "A verification error has occurred. Please check the URL again". Obviously, the configuration of the screens is not limited thereto, and may be any configuration. Here, use of the management screen of the relay client will be described. The present screen is used to acquire a list display of the image forming apparatuses managed by the relay client, perform various types of setting necessary for communication between the relay client and the server, and the like.

As described above, the management screen of the relay client is mainly used to perform the various types of setting necessary for communication between the relay client and the server, and it is considered that the access frequency is relatively small, and it is assumed that the password to log in to the management screen is forgettable.

As described above, only the user managed (registered) in the server as the user of the relay client can reset the password managed by the relay client for login to the management screen of the relay client.

Second Exemplary Embodiment

In the first exemplary embodiment, the URL is verified using the common verification information managed by the relay client and by the server. However, the URL of the password resetting screen can be continuously used unless the common verification information is updated, and this is not favorable in terms of security. Therefore, a method for making a URL of a password resetting screen temporarily valid will be described. Hereinafter, an exemplary embodiment of the present disclosure will be described with reference to the drawing.

<Processing for Updating Common Verification Information in Present Exemplary Embodiment>

Figure 9:
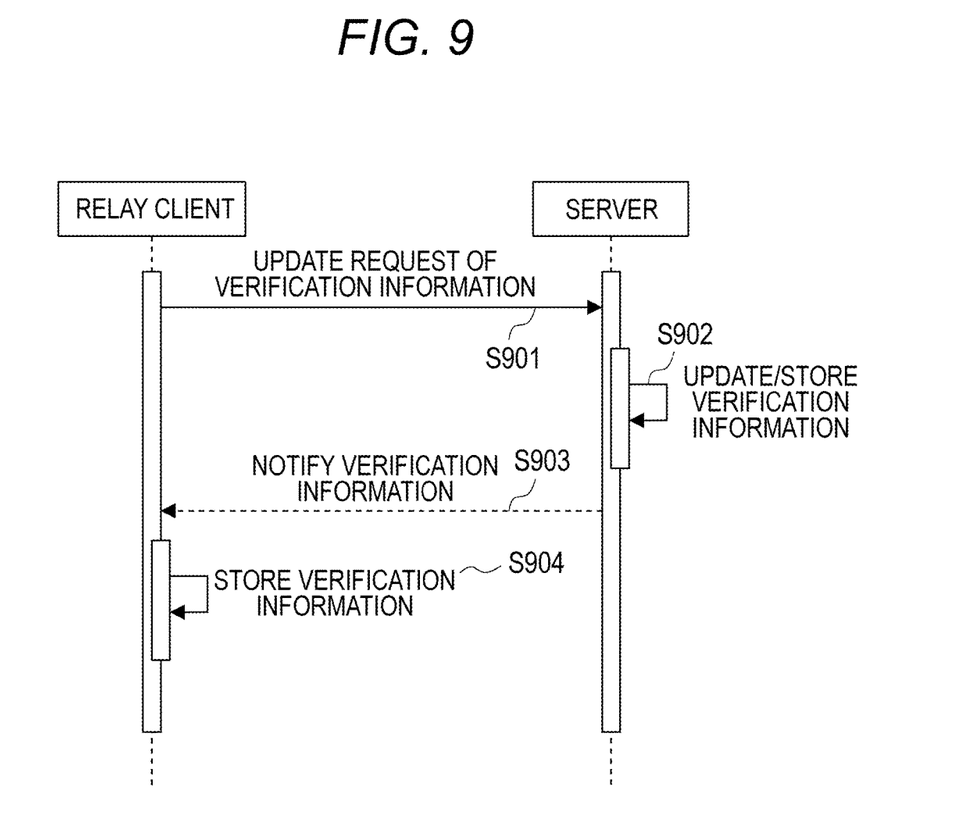
FIG. 9 is a sequence diagram illustrating an example of processing for updating verification information in a second exemplary embodiment.

FIG. 9 is a sequence diagram illustrating an example of processing for updating common verification information in the present exemplary embodiment. Assuming that the processing of step S516 in the first exemplary embodiment has been terminated immediately before processing enters this sequence.

In step S901, after completion of the processing of step S516 in the first exemplary embodiment, a transmitting unit 404 of a relay client 102 performs an update request of common verification information managed by a relay client and a server. A receiving unit 306 of a server 101 receives the request.

In step S902, a verification information generating unit 304 of the server 101 creates the common verification information between the server 101 and the relay client 102, and updates the existing common verification information. A storage unit 305 of the server 101 stores the newly generated common verification information to a storage device 202.

In step S903, a transmitting unit 307 of the server 101 notifies the relay client 102 of the newly generated common verification information. A receiving unit 405 of the relay client 102 receives the common verification information.

In step S904, a storage unit 403 of the relay client 102 stores the common verification information to the storage device 202.

Even in a case where verification fails in the processing of step S513 in the first exemplary embodiment, the common verification information managed by the relay client and by the server may be updated by executing the processing described in FIG. 9.

<Timing of Other Updating Processing>

In the present exemplary embodiment, the updating processing of the common verification information is performed after the password resetting. However, the common verification information may be periodically updated regardless of whether it is after the password resetting.

Further, to make the URL temporarily valid, a term of validity may be set to the common verification information, or to the URL itself of the password resetting screen. In this case, the relay client additionally performs verification of comparison between a current time and the term of validity in the processing of step S513 in the first exemplary embodiment. That is, in a case where the current time has passed the term of validity, the resetting screen of the password is not provided.

As described above, by updating the common verification information after resetting the password, the URL of the password resetting screen is made temporarily valid, and the intensity of the security can be increased.

Other Embodiments

Embodiment(s) of the disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-080647, filed Apr. 13, 2016, which is hereby incorporated by reference herein in its entirety.

What is claimed is:

1. A system including a relay client configured to collect data, a server configured to manage the data transmitted from the relay client and an information processing apparatus capable of displaying a second management screen provided by the relay client, the server comprising:
a memory storing first instructions; and
a processor which is capable of executing the first instructions causing the server to:
store first verification information corresponding to the relay client;
receive a request regarding a resetting of a password to be used for authentication by the relay client, wherein the password is managed by the relay client; and transmit, in response to the received request, access information for accessing to the relay client and the first verification information corresponding to the relay client, and the relay client comprising:

a memory storing second instructions; and a processor which is capable of executing the second instructions causing the relay client to:

store second verification information corresponding to the relay client;

manage the password to be used for the authentication for using the second management screen;

accept a request according to the access information, from the information processing apparatus, wherein the accepted request includes the first verification information;

verify validity of the first verification information included in the accepted request, using the stored second verification information;

provide a resetting screen for changing the managed password, to the information processing apparatus, when the validity of the first verification information is verified; and transmit an update request to the server in response to the password having been changed based on an input through the provided resetting screen, wherein the first instructions further cause the server to:

update the stored first verification information corresponding to the relay client in response to the update request from the relay client, wherein the first verification information is not the changed password, and notify the relay client of the updated first verification information.

2. The system according to claim 1, wherein the transmitted first verification information is encrypted by the server, and the encrypted first verification information is decrypted by the relay client, and it is determined that the validity of the first verification information included in the accepted request has been verified, when the decrypted first verification information and the stored second verification information are matched.

3. The system according to claim 1, wherein the relay client does not include a mail function.

4. The system according to claim 1, wherein the first verification information includes in the access information.

5. The system according to claim 1, wherein the first instructions further cause the server to generate the first verification information using a unique authentication key used when the relay client and the server perform communication.

6. The system according to claim 5, wherein the first verification information is generated by using the unique authentication key and an identifier for identifying software operated on the relay client.

7. A method for controlling a system including a relay client that collects data, a server that manages the data transmitted from the relay client, and an information processing apparatus capable of displaying a second management screen provided by the relay client, the server performs:

first storing first verification information corresponding to the relay client;

receive a request regarding a resetting of a password to be used for authentication by the relay client, wherein the password is managed by the relay client; and transmitting, in response to the received request, access information for accessing to the relay client and the first verification information corresponding to the relay client, and the relay client performs:

second storing second verification information corresponding to the relay client;

managing the password to be used for authentication for using the second management screen;

accepting a request according to the access information from the information processing apparatus, wherein the accepted request includes the first verification information;

verifying validity of the first verification information included in the request accepted in the accepting, using the second verification information stored in the second storing;

providing a resetting screen for changing the password managed in the managing, to the information processing apparatus, when the validity of the first verification information is verified in the verifying; and transmitting an update request to the server in response to the password having been changed based on an input through the provided resetting screen, wherein the server further performs:

updating the stored first verification information corresponding to the relay client in response to the update request from the relay client, wherein the first verification information is not the changed password, and notifying the relay client of the updated first verification information.

* * * * *